May 18, 1965     W. H. JACKMAN ETAL     3,184,356
METHOD FOR SLITTING AND SPLICING FILM
Filed Feb. 17, 1961     3 Sheets-Sheet 1

WARREN H. JACKMAN
ROBERT H. JOHANSON
INVENTORS

BY R. Frank Smith
Steve W. Grembow
ATTORNEYS

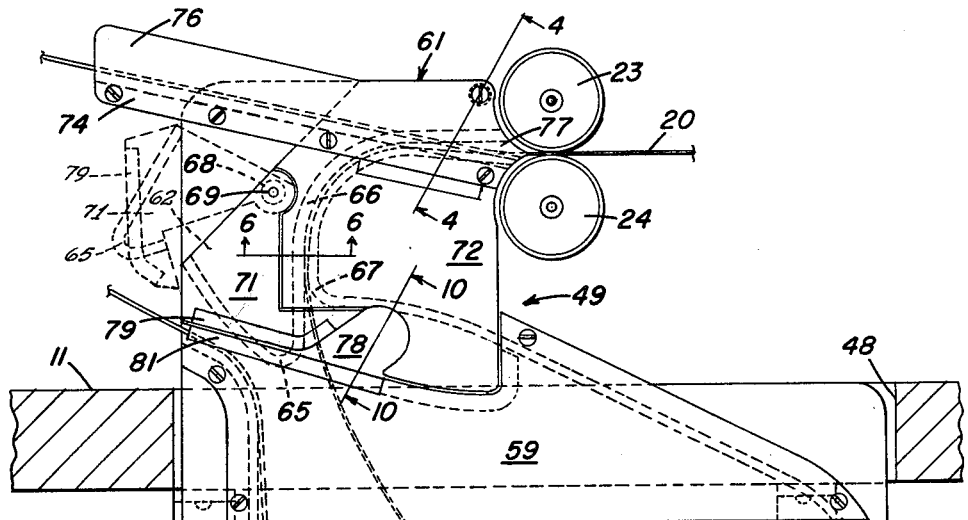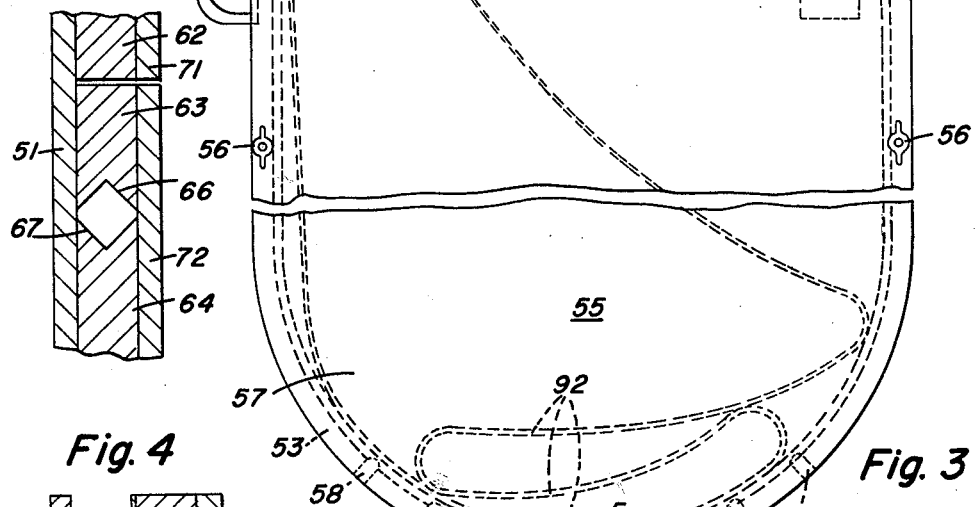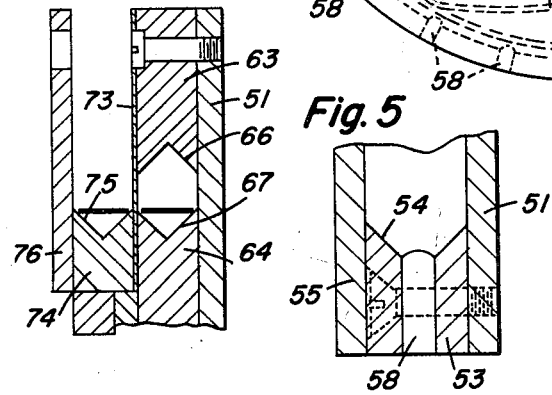

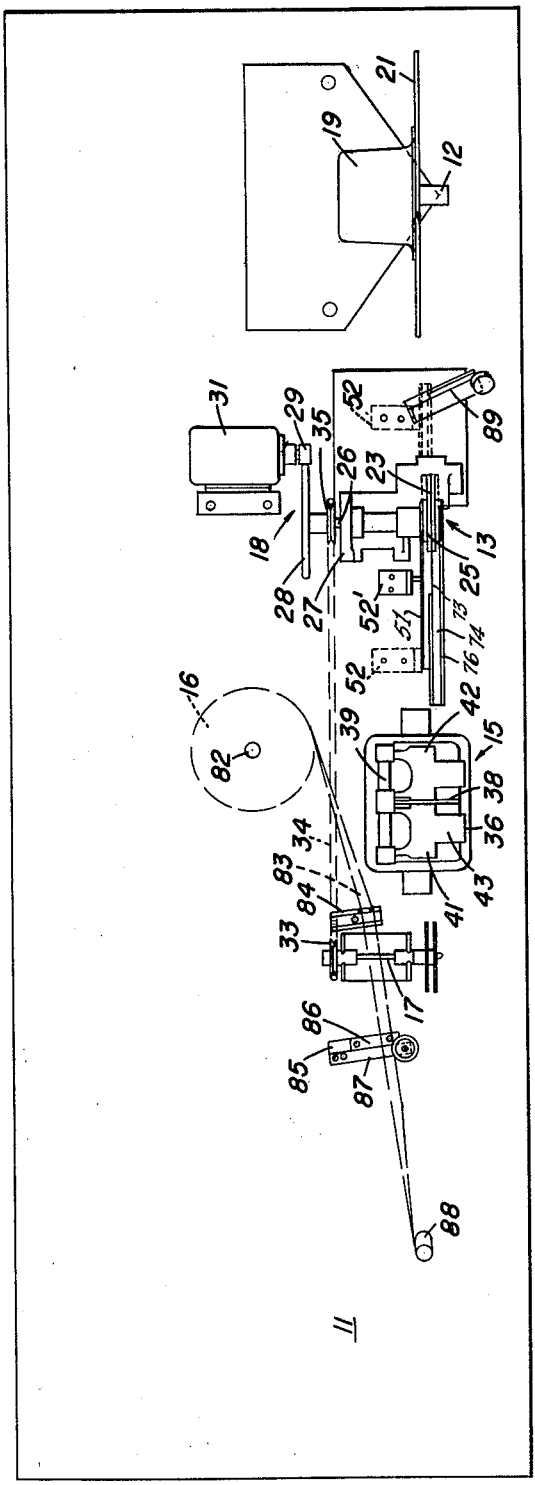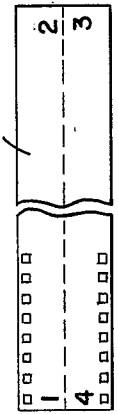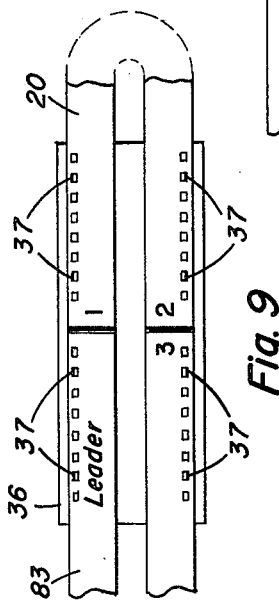
WARREN H. JACKMAN
ROBERT H. JOHANSON
INVENTORS
ATTORNEYS United States Patent Office 3,184,356
Patented May 18, 1965

3,184,356
METHOD FOR SLITTING AND SPLICING FILM
Warren H. Jackman and Robert H. Johanson, Rochester, N.Y., assignors to Eastman Kodak Company, Rochester, N.Y., a corporation of New Jersey
Filed Feb. 17, 1961, Ser. No. 89,989
2 Claims. (Cl. 156—159)

This invention relates generally to splicing, and more specifically to an apparatus and method for slitting a 16 mm. film into two 8 mm. strips, splicing the two 8 mm. filmstrips together in endwise relation and attaching a leader to one end of one of the strips.

It is well known in the photographic industry to provide film rolls and magazines for use in 8 mm. cameras in which the film contained in the roll or magazine is of a specified length and is of a 16 mm. width sufficient to receive two rows of images, side by side. When the roll or magazine is positioned in the camera in one way, the operator can run off the full length of film exposing only one-half the film to record a first row of images thereon. The operator may then remove the roll or magazine and reposition it in the camera after it has been turned through an angle of 180°. It is then possible to run off the same length of film exposing the other half to record a second row of images inverted relatively to those in the first row. The roll or magazine with the exposed film is then shipped to a photofinisher who processes the film. After the film is processed, the photofinisher slits the 16 mm. film into first and second 8 mm. strips each having a start end and a finish end, attaches the start end of the first strip on one reel and the finish end of the second strip on another reel, and winds the strips thereon. After the strips are completely wound on the reels, the photofinisher takes the free ends of the strips from the reels, which is the finish end of the first strip and the start end of the second strip, and splices them together. The photofinisher then unwinds the first strip from its reel onto the other reel so that the entire length of 8 mm. film is now wound on only a single reel, having the finish end of the second strip attached to its hub, the finish end of the first strip and start end of the second strip spliced together, and the start end of the first strip free. The photofinisher then splices a leader to the start end of the first strip, and the film is ready for packaging for shipment back to the customer. The above described method of handling the customer's film after the processing has been completed suffers from the disadvantage that two separate splices must be made, and a portion of the film wound onto and then off a reel. Applicant's invention obviates these disadvantages, and permits the photofinisher to accomplish the splicing operations simultaneously, and substantially decreases the time required to slit the film and wind the slit film on a single reel.

One of the primary objects of the present invention is to provide an improved apparatus and method for slitting a processed 16 mm. film into two 8 mm. strips, and simultaneously splicing the end of a leader to the start end of one strip, and the finish end of one strip to the start end of the other strip.

Another object of this invention is to provide an improved apparatus and method for slitting a 16 mm. film into two 8 mm. strips, simultaneously splicing the end of a leader to the start end of one strip and the finish end of one strip to the start end of the other strip, and winding the spliced film strips onto a single reel at a much faster rate of speed than was heretofore possible.

Still another object of this invention is to provide an improved apparatus for slitting a 16 mm. film into two 8 mm. strips, splicing the ends of two strips together and a leader onto one end thereof to form a finished 8 mm. film wound onto a single reel that is of simple design and construction, thoroughly reliable and efficient in operation, and economical to manufacture.

Objects and advantages other than those set forth above will be apparent from the following description when read in connection with the accompanying drawing, in which:

FIG. 2 is a top plan view of the apparatus of FIG. 1;

FIG. 3 is an enlarged side elevation view of a portion of the apparatus shown in FIG. 1;

FIG. 4 is a segmental view in section taken along line 4—4 of FIG. 3;

FIG. 5 is a segmental view in section taken along line 5—5 of FIG. 3;

FIG. 6 is a segmental view in section taken along line 6—6 of FIG. 3;

FIG. 7 is a view diagrammatically showing a film prior to being slit along the dotted line into two 8 mm. strips;

FIG. 8 is a view diagrammatically showing the filmstrips of FIG. 7 spliced together and a leader spliced to the end of one of the strips;

FIG. 9 is a view diagrammatically showing how the leader and the ends of the film strips shown in FIG. 7 are mounted on a splicing block for simultaneously splicing the strips together, and the leader to one of the strips.

Figure 1:
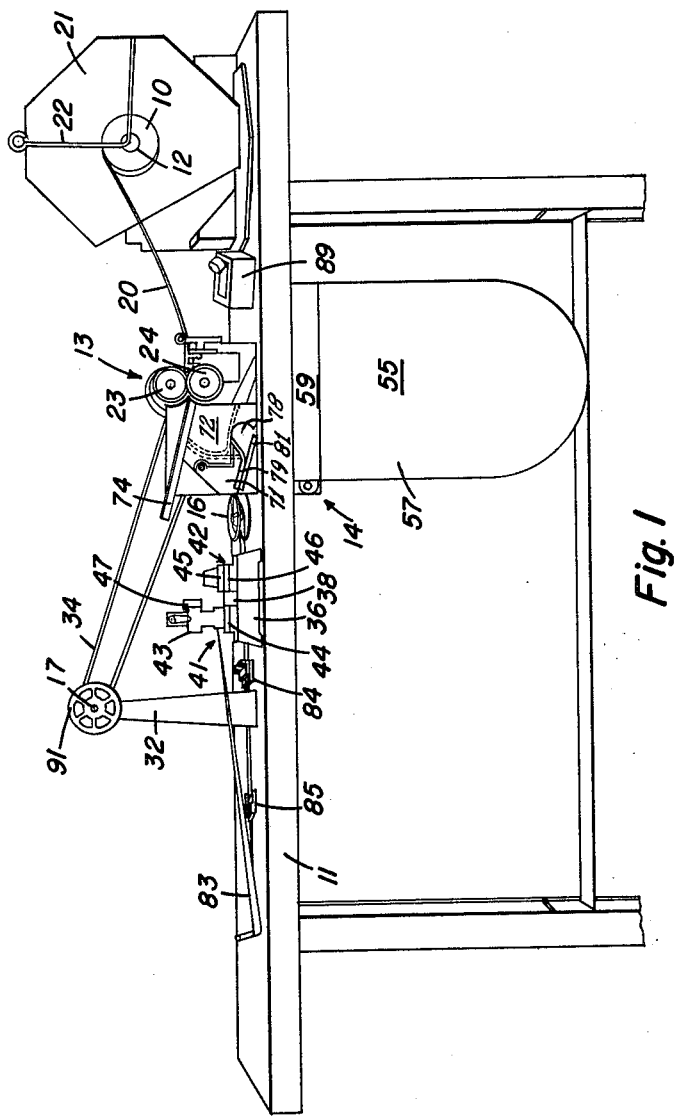
FIG. 1 is a perspective view showing a preferred embodiment of the apparatus of this invention.

As shown in the drawings, the apparatus of this invention is supported on a work table 11, and generally comprises a supply spindle 12, a slitter 13, a film receiver 14, a splicer 15, a leader supply reel 16, a take-up spindle 17, and a drive mechanism 18 for driving slitter 13 and take-up spindle 17. The supply spindle 12 is rotatably supported by a housing 19 as seen best in FIG. 2 having a disk-like flange 21 forming a back stop for a supply reel 10 of customer film 20 which has been processed. The reel 10 is mounted on supply spindle 12 and is rotatable therewith, and is held against flange 21 by a spring-biased retaining arm 22 seen in FIG. 1. The housing 19 further houses an electrically operated brake, not shown, for stopping spindle 12 as soon as drive mechanism 18 is turned off.

The customer's film 20 is essentially as shown in FIG. 7 having a first row of images with a start end designated 1 and a finish end designated 2, and a second row of images inverted relatively to the first row having a start end 3 and a finish end 4. It is evident from a study of the film 20 that the customer in taking his movies progressed in the first row from the start end 1 to the finish end 2, then inverted his roll or magazine in the camera and progressed with the movies in the second row from the start end 3 to the finish end 4.

The slitter 13 may be any conventional type of slitter mounted on work table 11 for slitting the customer's roll of film along its center line, shown dotted in FIG. 7, for dividing a roll of 16 mm. film into 8 mm. strips. In this slitting operation, the end of the customer's film designated 1 and 4 in FIG. 7 is fed into slitter 13. The slitter 13, as shown in FIGS. 1 and 2, comprises upper and lower slitting disks 23, 24 respectively adapted to cooperate together for slitting a film which is fed therebetween by a friction roller 25 adjacent disk 23 and rotatable therewith. Disk 23 is mounted on a shaft 26 rotatably supported by the slitter housing 27, and a friction wheel 28 is mounted on the other end thereof which is in driving engagement with a drive wheel 29 driven by any suitable type of motor 31. The friction and drive wheels 28, 29 are provided with some suitable type of friction material such as rubber or the like on their periphery to facilitate driving engagement therebetween. Since slitter 13 is of well known construction and does not form a part of the invention other than its environmental relationship thereto, it will be referred to only generally and will not be described in detail. This is so particularly since any type of conventional slitter may be used.

An upwardly extending bracket 32 is mounted on work table 11 for rotatably supporting take-up spindle 17. A pulley 33 is mounted on one end of spindle 17, and is connected by a flexible helical spring belt 34 or the like to a drive pulley 35 mounted on shaft 26.

The splicer 15 is mounted on work table 11 intermediate the bracket 32 and slitter 13. The splicer 15 may be a commercially available Griswold, Jr. splicer in which the splicing block 36 has been modified by moving the pins 37 on the splicing block to accommodate one end of the leader and three ends of the filmstrips as seen in FIG. 9. Essentially, the Griswold, Jr., splicer comprises the block 36 having a fixed stationary blade 38 and a shaft 39 for pivotally supporting two film clamps in 41, 42 spaced in side-by-side relation. Flm clamp 41 comprises a pair of pivotally mounted, upper and lower clamping jaws 43, 44 respectively adapted to receive and hold a portion of the film to be spliced. Film clamp 42 comprises a similar pair of upper and lower clamping jaws 45 and 46 respectively. The lower jaw 44, 46 of each respective clamp 41, 42 is provided with the locating pins 37 adapted to co-operate with the film perforations for properly positioning the filmstrips thereon. The upper jaw 43, 45 in each case co-operates with its respective lower jaw 44, 46 to hold the film therebetween. In the operation of a conventional splicer of this type, one of the film clamps is raised and the lower jaw of the other film clamp lowered into a position for receiving film. Let us assume that the left clamp 41 is raised and the lower jaw 46 of the right clamp lowered, although the reverse could be true. One film end is placed on the right lower jaw 46, the right upper jaw 45, is closed to hold the film therebetween and the left lower jaw 44 is lowered to co-operate with stationary blade 38 for trimming off the end of the film. The right film clamp 42 is then raised. The film end to be spliced to the other end is then placed on left lower jaw 44 overlapping stationary blade 38, left upper jaw 43 closed to hold the film therebetween, and right film clamp 42 lowered causing lower jaw 46 to co-operate with stationary blade 38 to sever the film end held by left film clamp 41. Since right lower jaw 46 co-operates with the right side of stationary blade 38, and left lower jaw 44 co-operates with the left side of stationary blade 38, the end portions of the film overlap by an amount equal to the width of stationary blade 38. The left film clamp 41 is then raised, the emulsion removed from the end of the film held by the right clamp 42, cement applied thereto, and the left film clamp 41 lowered causing a pressure pad 47 to urge the end of the film held by left film clamp 41 into engagement with the film end held by right film clamp 42.

The work table 11 is provided with an elongated slot 48 intermediate splicer 15 and slitter 13 through which a film receiver 14 extends. The film receiver 49 comprises a back plate 51 secured to table 11 by clamps or brackets 52. A substantially U-shaped film track 53 is secured along the periphery of the lower portion of back plate 51 and has a V-shaped groove 54 therein as seen best in FIGS. 3 and 5 to minimize contact between film 20 and film track 53. A cover plate 55 is removably secured to the lower end of track 53 by wing nuts 56 to form a film storage chamber 57 for storing film 20 in loops. The track 53 further has a plurality of radially extending openings 58 therethrough to permit air to escape from chamber 57 as it fills up with film, and further to permit dust formed by the slitting operation to be shaken off film 20 and pass through openings 58. Another cover plate 59 irregular in shape is rigidly secured to film track 53 adjacent the upper end of cover plate 55 to complete the storage chamber 57.

The upper end of receiver 49 has a guide mechanism 61 comprising three separate members 62, 63, and 64 secured to back plate 51 as seen in FIGS. 3 and 6, and each member forms a respective V-shaped film track 65, 66 and 67 to form an entrance opening for guiding film 20 into chamber 57. The member 62 further has a bushing 68 pivotally mounted on a stud 69 secured to back plate 51 which forms a pivot for member 62. Member 62 is pivotally movable between a normal position (shown in full lines in FIG. 3) in which track 65 forms a part of the entrance and exit openings to chamber 57, and a second position (shown dotted in FIG. 3) in which it enlarges the exit opening from chamber 57. Cover plates 71 and 72 are secured to members 62, 63, and 64, and a film-separating plate 73 is mounted on members 63, 64 as best seen in FIG. 4. A substantially straight film chute 74 having a V-shaped groove 75 therein is secured to members 63, 64 and a front cover plate 76 is secured to chute 74. The separator 73 and cover plate 76 have a V-shaped peripheral projection 77 adapted to extend into the nip of the slitter blades 23, 24 as seen in FIG. 3 so that the film strips after slitting will be guided and directed along the chute 74 and track 67 respectively as seen in FIG. 4.

Figure 10:
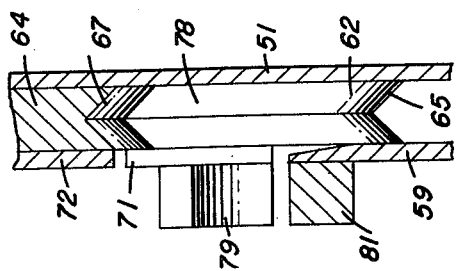
FIG. 10 is a segmental view in section taken along line 10—10 of FIG. 3.

The cover plates 59, 71, 72 co-operate to form a recess 78 therebetween into which the operator may insert a finger to facilitate urging the film 20 and pivotal member 62 outwardly from its normal position into its second position shown dotted in FIG. 3. To facilitate this operation, the cover plates 71, 59 are provided with laterally extending respective upper and lower finger guides 79, 81 as seen in FIGS. 3 and 10, and the operator's finger moves along the lower guide 81 and engages the upper guide 79 for pivotally moving the member 62 into the dotted position shown in FIG. 3. When the operator's finger is removed, member 62 returns to its operative position under the influence of gravity.

The leader storage reel 16 is rotatably mounted on a fixed stud 82 secured to work table 11, and the leader 83 is threaded through a turning device 84 which turns the leader through 90 degrees from a vertical to a horizontal position for passage through a cutting device 85 of known type containing an anvil 86 and a pivoted knife 87 cooperable therewith for severing leader 83. The leader 83 passes around a post 88 mounted on table 11, and may then be attached to the splice block 36. A cutting device 89 similar to device 85 is mounted on table 11 between supply reel 10 and slitter 13 to enable the operator to sever the end of the customer's film 20.

In the operation of this invention, the operator initially mounts a roll 10 of customer film 20 on supply spindle 12 and feeds the film manually along a track into slitter 13. The operator then presses a foot pedal or the like which connects the power supply to drive motor 31 for driving cutting disks 23, 24 and friction roller 25. The end of film 20 designated 1 and 4 in FIG. 7 is fed into slitter 13, and film 20 is advanced and slit into two 8 mm. strips which are separated by separating plate 73. The operator stops drive motor 31 after approximately two feet of film 20 has been slit, and attaches the finish end designated 4, emulsion side down, to a take-up reel 91 mounted on take-up spindle 17. The operator inserts a finger, normally the right forefinger, into recess 78 and simultaneously moves the pivotal member 62 into its dotted position shown in FIG. 3 to unblock the exit opening in chamber 57, and start end of film 20 designated 1, which is guided between film guide members 66, 67 as seen in FIGS. 3 and 4, out of film chamber 57 through the unblocked exit opening. The operator then restarts drive motor 31 and as the film slitting continues, the other strip enters film chamber 57 and is stored therein in the form of film convolutions or loops 92 as seen dotted in FIG. 3. The operator unwinds a specified length of leader 83 from leader supply reel 16, severs the leader, and places one end thereof, dull side up, over the rear pins 37 of lower left jaw 44, the upper left jaw 43 and right film clamp 42 being raised. When the slitting of customer's film 20 is completed, the operator places the start end designated 3 over front pins 37 on lower left jaw 44 of splicer 13 with the emulsion side up. The upper left jaw 43 is lowered closing the left film clamp 41, and the film ends trimmed by lowering right lower jaw 46. The operator then raises left film clamp 41 and places the end of film 20 designated 1, emulsion side down, on rear pins 37 of right lower jaw 46, and removes the finish end designated 2 from storage chamber 57 by a finger and places it, emulsion side up, on front pins 37 of lower right jaw 46. The right film clamp 42 is then closed and trimmed by lowering the left film clamp 41. The operator then raises left film clamp 41, applies water to the trimmed ends extending from right film clamp 42, scrapes off the softened emulsion with a scraper from the film end designated 2, applies cement to both film ends 1 and 2, and lowers left film clamp 41 urging the trimmed ends extending therefrom by a pressure pad 47 into engagement with the ends to which the cement has been applied. After the splice is dried, the left and right upper jaws 43, 45 are raised, the filmstrips removed from lower jaws 44, 46, and motor 31 operated for driving take-up reel 91 for winding the film 20 and leader 83, spliced as seen in FIG. 8, thereon. The operator places a rubber band, not shown, around the outer periphery of the wound film, removes reel 91 from take-up spindle 17, and it is ready for packaging for shipment back to the customer.

The invention has been described in detail with particular reference to a preferred embodiment thereof, but it will be understood that variations and modifications can be effected within the spirit and scope of the invention as described hereinabove and as defined in the appended claims.

We claim:

1. The method for slitting a film of predetermined width advanced through a slitter into first and second strips, each having a start end and a finish end, and simultaneously splicing the end of a leader to the start end of the first strip, and the finish end of the first strip to the start end of the second strip for forming a single continuous film of one-half said predetermined width, comprising: slitting a film of predetermined width into first and second strips; winding a portion of said second strip onto itself and storing all of said first strip except its ends; placing one end of a leader and the start end of the second strip in side by side relation; placing the start end of the first strip in alignment with said leader, and the finish end of the first strip in alignment with the start end of the second strip; simultaneously splicing one end of the leader to the start end of the first strip, and the finish end of the first strip to the start end of the second strip; and winding the remaining portion of said second strip and said first strip and leader spliced thereto.

2. The method for slitting a film of predetermined width advanced through a slitter into first and second strips, each having a start end and a finish end, and simultaneously splicing the end of a leader to the start end of the first strip, and the finish end of the first strip to the start end of the second strip for forming a single continuous film of one-half said predetermined width, comprising: slitting a film of predetermined width into first and second strips; winding a portion of said second strip onto itself and storing all of said first strip except its ends; placing one end of a leader, and the start end of the second strip, emulsion side up, in side by side relation; placing the start end of the first strip, emulsion side down, in alignment with said leader, and the finish end of the first strip, emulsion side up, in alignment with the start end of the second strip; simultaneously splicing one end of the leader to the start end of the first strip, and the finish end of the first strip to the start end of the second strip; and winding the remaining portion of said second strip and said first strip and leader spliced thereto.

References Cited by the Examiner

UNITED STATES PATENTS

| | | | |
|---|---|---|---|
| Re. 23,875 | 9/54 | Speed et al. | 154—42.3 |
| 2,265,466 | 12/41 | Winter | 242—56.4 |
| 2,698,359 | 12/54 | Roberts | 242—56.4 |

EARL M. BERGERT, *Primary Examiner.*

CARL F. KRAFTT, *Examiner.*